(12) United States Patent
Hasek et al.

(10) Patent No.: US 10,694,241 B2
(45) Date of Patent: Jun. 23, 2020

(54) CAPTURING BORDER METADATA WHILE RECORDING CONTENT

(71) Applicant: Layer3 TV, Inc., Denver, CO (US)

(72) Inventors: Charles Hasek, Denver, CO (US); Vic Odryna, Denver, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/001,709

(22) Filed: Jun. 6, 2018

(65) Prior Publication Data

US 2018/0359517 A1 Dec. 13, 2018

Related U.S. Application Data

(60) Provisional application No. 62/516,887, filed on Jun. 8, 2017.

(51) Int. Cl.
| | | |
|---|---|---|
| *H04N 21/433* | (2011.01) | |
| *H04N 21/4147* | (2011.01) | |
| *H04N 21/472* | (2011.01) | |
| *H04N 21/431* | (2011.01) | |
| *H04N 21/462* | (2011.01) | |
| *H04N 21/482* | (2011.01) | |

(52) U.S. Cl.
CPC ..... *H04N 21/4334* (2013.01); *H04N 21/4147* (2013.01); *H04N 21/4312* (2013.01); *H04N 21/4622* (2013.01); *H04N 21/47202* (2013.01); *H04N 21/4821* (2013.01)

(58) Field of Classification Search
CPC .......... H04N 21/4334; H04N 21/4622; H04N 21/4147; H04N 21/47202; H04N 21/4312; H04N 21/4821; H04N 21/4882
See application file for complete search history.

(56) References Cited

U.S. PATENT DOCUMENTS

| | | | |
|---|---|---|---|
| 2003/0149980 A1* | 8/2003 | Hassell | H04N 21/2387 725/39 |
| 2006/0104611 A1* | 5/2006 | Gildred | H04N 21/4583 386/295 |
| 2006/0168625 A1* | 7/2006 | Gildred | H04N 5/76 725/58 |
| 2011/0194838 A1* | 8/2011 | Meijer | H04N 21/4147 386/249 |
| 2016/0088361 A1* | 3/2016 | Killick | H04N 21/812 725/32 |
| 2017/0118526 A1* | 4/2017 | Tanji | H04N 21/4882 |
| 2018/0098103 A1* | 4/2018 | Lintz | H04N 21/23418 |

* cited by examiner

*Primary Examiner* — Hai V Tran
(74) *Attorney, Agent, or Firm* — Brownstein Hyatt Farber Schreck, LLP

(57) ABSTRACT

A digital video recorder records first content from a channel broadcast that includes second content adjacent to the first content in response to a user request and stores a border around the first content that includes a portion of the second content and metadata related to the second content. The border may be previous and/or subsequent to the first content. In some implementations, the digital video recorder may obtain the metadata from a source other than from which the digital video recorder receives the content. The first content and the metadata may be recorded at the same and/or different times.

20 Claims, 11 Drawing Sheets

CAPTURING BORDER METADATA WHILE RECORDING CONTENT

CROSS-REFERENCE TO RELATED APPLICATION(S)

This application is a nonprovisional patent application of and claims the benefit of U.S. Provisional Patent Application No. 62/516,887, filed Jun. 8, 2017 and titled "Capturing Border Metadata While Recording Content," the disclosure of which is hereby incorporated by reference herein in its entirety.

FIELD

The described embodiments relate generally to content recording such as digital video recording. More particularly, the present embodiments relate to capturing border metadata associated with content borders recorded around a stored instance of content.

BACKGROUND

Metadata is data about data. For example, television programs or the like streamed or otherwise transmitted in a content stream associated with a channel may be broadcast with metadata about the programs. This metadata may describe the programs and may include various information such as titles, actor names, summaries, air date information, channel information, identifiers for the program, recording codes, and/or any other information that describes the program.

In some cases, the received television programs or the like may be recorded, such as using a digital video recorder, network digital video recorder, or the like. The recording may be instructed previous to the air time of the program. For example, the program may be scheduled to be broadcast for a particular channel at a particular time. As such, the particular channel may be recorded at the particular time in order to record the program.

SUMMARY

The present disclosure relates to capturing metadata for recorded content. An instance of content is recorded from a channel broadcast and/or other linear broadcast or content stream. A border that is a portion of an additional instance of content adjacent to the first content, such as content airing before or after the first content, is included. The border may accommodate schedule deviations to ensure the entire first content is recorded even if it starts earlier and/or ends later than scheduled. Metadata for this second content, which may be included with the broadcast, may also be recorded and/or stored. The metadata regarding the content of the border may be available to be presented upon user request in case the user becomes curious about the partially recorded additional content while accessing the intentionally recorded first content.

In various implementations, a digital video recorder device includes a non-transitory storage medium and a processing unit. The processing unit executes instructions stored in the non-transitory storage medium to record an instance of content that is broadcast as part of a content stream including an additional instance of content adjacent to the instance of content, include a border in the recording that is a portion of the additional instance of content, store metadata related to the additional instance of content, and provide the metadata related to the additional instance of content upon request during access of the recording.

In some examples, the processing unit provides the metadata while presenting the portion of the additional instance of content from the recording. In some cases of such examples, the processing unit provides the metadata to identify the additional instance of content.

In numerous examples, the additional instance of content is previous to the instance of content in the content stream. In some examples, the border accommodates a broadcast schedule deviation for the instance of content. In various examples, the metadata includes a description of the additional instance of content. In numerous examples, the border includes less than five minutes of the content stream.

In some implementations, a digital video recorder system includes a non-transitory storage medium and a processing unit. The processing unit executes instructions stored in the non-transitory storage medium to, in response to a user request, record first content from a channel broadcast that includes second content adjacent to the first content and store a border around the first content that includes a portion of the second content and metadata related to the second content.

In various examples, the processing unit receives a request for the metadata during presentation of the recording and provides the metadata. In some examples, the processing unit provides the metadata as part of presenting programming guide information. In numerous examples, the processing unit discards additional metadata from the channel broadcast. In various examples, the processing unit records the first content from the channel broadcast by recording the channel broadcast during a time period associated with the first content.

In some examples, the second content is subsequent to the first content in the channel broadcast. In various examples, the non-transitory storage medium and the processing unit are components of a user content access device that is operable to receive the channel broadcast from a content provider device.

In numerous implementations, a method for operating a digital video recorder includes storing content received as part of a linear broadcast as a recording in a non-transitory storage medium, adding a border to the recording that includes a portion of additional content that is adjacent to the content in the linear broadcast, obtaining metadata for the additional content, and including the metadata in the recording.

In various examples, obtaining the metadata for the additional content includes obtaining the metadata for the additional content from a source other than the linear broadcast. In some such examples, the source is an internet. In numerous examples, obtaining the metadata for the additional content includes obtaining the metadata for the additional content after adding the border to the recording.

In some examples, adding the border to the recording is performed at a same time as storing the content. In various examples, the method further includes presenting the content from the recording on demand.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
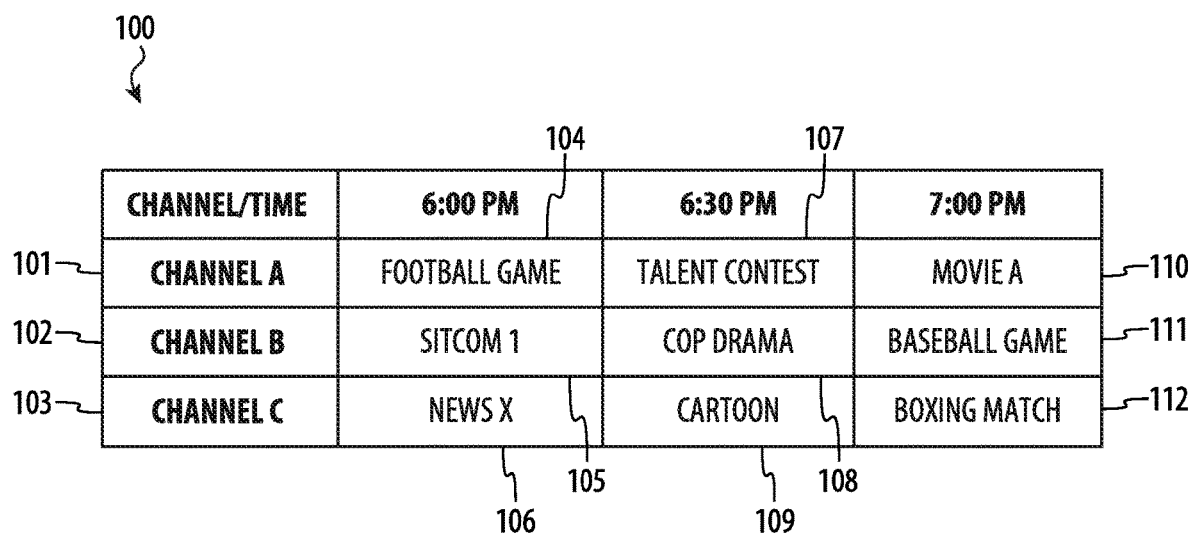
FIG. 1 depicts a guide illustrating content that may be recorded by a system for capturing border metadata while recording content. Such a system may be one or more of the systems of FIGS. 3, 4, 8, and/or 9.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

The following disclosure relates to capturing metadata for recorded content. An instance of content is recorded from a channel broadcast and/or other linear broadcast or content stream. A border that is a portion (such as less than five minutes) of an additional instance of content adjacent to the first content, such as content airing before or after the first content, is included. The border may accommodate schedule deviations to ensure the entire first content is recorded even if it starts earlier and/or ends later than scheduled. Metadata for this second content (and/or metadata for the first content and/or other content), which may be included with the broadcast, may also be recorded and/or stored. As such, the metadata regarding the content of the border may be presented upon user request in case the user becomes curious about the partially recorded additional content while accessing the intentionally recorded first content.

Television programs or the like may be streamed or otherwise broadcast in a content stream associated with a channel. The program may be scheduled to be broadcast for a particular channel at a particular time and that channel may be recorded at that particular time in order to record the program. However, schedule deviations may occur. For example, a football game may go into overtime and run four minutes beyond its scheduled time slot. As a result, a program scheduled on the same channel after the football game may start four minutes late. To compensate for that, borders may be added at the beginning and/or the end of programs to ensure that the entire program is recorded despite minor deviations. These borders may be portions of other programs that are adjacent to the program in the broadcast, such as prior or subsequent to the program.

Metadata associated with a broadcast may be discarded once the broadcast is no longer being currently received. However, metadata related to the program may be recorded. This metadata may be accessed in order to present information related to the program (such as a title, an actor name, a summary, air date information, channel information, an identifier for the program, recording codes, and/or any other information). This may be presented in a menu listing recordings, a menu presented while the recorded program is being presented, as part of a program or other guide, and so on. This may also be searched to find various segments of the program during replay, and so on.

However, in such a case, recording only the metadata for the program may not be sufficient. As the recording may involve border regions that are portions of other programs, those portions may end up being presented to users when they access the recording. They may become curious about the fragments of these programs and may desire to know more. However, without the metadata, there may not be a way to provide the user information about such programs.

Some systems may store metadata for such borders along with the recorded programs. In this way, when users provide input indicating a desire to know more about the programs partially represented in the borders, relevant stored metadata may be accessed in order to process the users' requests.

Embodiments of the present disclosure may relate to a system and method of boundary content data capture of file information and/or metadata in an adaptive bit rate (ABR) content delivery network (CDN). More particularly, embodiments of the present disclosure may relate to capturing pre- and post-recording broadcast time file information and/or metadata for digitally recorded content for a subscriber so as to identify information regarding such pre- and post-media content to the subscriber on-demand.

Content may take many forms such as, for example, movies and live broadcast programming delivered across a CDN to the subscriber (e.g., client, viewer, ultimate user, and customer). Content may be identified as linear content broadcast in a linearly and static way (i.e., linear programming) or non-linear content broadcast in a time-shifted, on demand or video on demand (VOD) way. In some systems, content may be streamed to a user across a network with information (i.e., metadata) about the programming such as title, description, and other useful information that a user can utilize to identify a particular program being viewed on demand such as, for example, by seeking information from the scheduling guide of a set top box. Each such request may seek the metadata file transmitted along with the linear or nonlinear broadcast media content and display the contents to the user. Once the channel is changed, or the broadcast media content changes because of a new time segment broadcast media content, that metadata may be lost. For example, guide information may not be available for post-broadcast media content for when switching between channels as such metadata information may be dumped from storage or cache of the network, TV or set top box.

In situations where a user views a portion of the pre-recording time content and would like to know more about such broadcast media content, the information about such broadcast media content may be lost and may not be retrieved on demand. Information may be lost and may not be replaced because the guide information about scheduled broadcast information may be locally rendered. When the guide information is stored on a scheduled network digital recording, information also may be lost because pre- and post-guide information may not be consistently rendered and saved for the guide information.

Situations may also occur when a user decides to digitally record broadcast media content. For example, a user may schedule the recording of desired scheduled broadcast media content. In some cases, the user may utilize controls to record or otherwise store a desired scheduled broadcast media content for later viewing (i.e., using a digital video recorder (DVR)). In various cases, a DVR system may begin the recording and storage a predetermined period prior and/or after to the scheduled broadcast media content so as to ensure the capture of the entire scheduled broadcast media content. As a result, small amounts of pre- and post-broadcast media content may be stored in this way that can be displayed to the user.

In this way, DVR or network DVR (nDVR) systems may begin and end the recording of media content on the broadcast scheduled boundary at the predefined record period. Upon playback, the user may view certain frames of pre-recording time content that may be of interest and the user may want to learn more about. For example, the user may want to order on demand the programming contained in those certain frames. Similarly, upon playback, the user may view certain frames of post-recording time content that may be of interest and the user may want to learn more about. However, some DVR systems and methods may not store the pre- and post-recording time content metadata of the broadcast media content information in a way that the user can access on demand. As such, the user may have no way to identify the pre- and/or post-broadcast media content program.

However, the present disclosure provides a system and method of recording and storing information and/or metadata on the boundary of the scheduled broadcast media content. In particular, the present disclosure may store pre- and post-broadcast media content. The systems and methods of the present disclosure may also use guide information and broadcast media content metadata from other sources, such as those available on the Internet. For example, the present disclosure may obtain metadata from a broadcaster's website concerning its broadcast schedule, content owner's information, and/or other data sources. The present disclosure provides a system and method of identifying, obtaining and storing pre- and post-broadcast media content that may perform these functions in an efficient and cost-effective manner.

The present disclosure may provide a system and method of capturing schedule information regarding broadcast media content in the period of pre- and post-broadcast of digitally recorded content by a subscriber so as to identify information regarding such pre- and post-broadcast media content to the subscriber on-demand. It may provide a system and method of recording and storing broadcast media content information and/or metadata on the boundary of the scheduled broadcast media content to preemptively cache the metadata of such pre- and post-broadcast media content in anticipation of the subscriber requesting information about such broadcast media content on-demand. It may further provide a system and method of identifying, obtaining and storing pre- and post-broadcast media content that overcomes the disadvantages of the prior art in an efficient and cost-effective manner. In various implementations, the present disclosure may provide a system and method of identifying, obtaining and storing pre- and post-broadcast media content obtained from various sources of guide information and broadcast media content metadata (such as, for example, the group of a broadcasters website concerning its broadcast schedule, content owner's information, and other data sources).

Non-limiting embodiments of the present disclosure will be described below with reference to the accompanying drawings, wherein like reference numerals may represent like elements throughout. While the disclosure has been described in detail with respect to the preferred embodiments thereof, it will be appreciated that upon reading and understanding of the foregoing, certain variations to the preferred embodiments will become apparent, which variations are nonetheless within the spirit and scope of the disclosure.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present disclosure, and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein, the term ABR may refer to a technique used in streaming multimedia over computer networks on a HTTP-based media stream and designed to work efficiently over large distributed HTTP networks such as the Internet. As used in the present disclosure, the CDN may be configured to communicate media content broadcast in one or more multiple bit rate segments and file information (e.g., MPEG formatted segments extracted from the analog and digital TV signal streams, for example, analog forms such as National Television Standards Committee (NTSC) or PAL broadcast, and digital forms such as Digital Satellite System (DSS), Digital Broadcast Services (DBS), or Advanced Television Standards Committee (ATSC) and encode media content into segments and file information (e.g., media segments representing frames of video or other programming) by way of Transmission Control Protocol (TCP)/Internet protocol suite (IP) and a variety of protocols (e.g., HTTP, HTTPS, SMTP, POP3, IMAP, SSH, FTP, Telnet, etc.) encapsulated in TCP to transfer and deliver across the CDN.

As used herein, the term "application programming interface" or "API" may refer to a software component in terms of its operations, inputs, outputs, and underlying types. This may include a set of routines, protocols, and tools for building software applications.

As used herein, the term "DVR" may refer to a device or application software that digitally compresses analog and/or video feeds and stores these feeds in memory (i.e., that records video in a digital format to a hard-drive, system memory, a disk drive, USB flash drive, SD memory card, SSD or other local or networked mass storage device, etc.). The term includes set top boxes (STB) with direct to disk recording facility, portable media players (PMP) with recording, recorders (PMR) as camcorders that record onto Secure Digital memory cards and software for personal computers which enables video capture and playback to and from a hard disk drive. The term "digital" refers to the compression and storage technology, not the transmitted video images.

As used herein the term "nDVR" may refer to a device or application software that stores digital images or video on the network "in the cloud" (e.g., directly from the IP-network into a networked mass storage device). As used herein the term "Quality of Services" or "QoS" may refer to a device or application software device that is capable, in order to comply with bandwidth limitations of a network, of limiting the transmission rate it uses for transmission or reception over the network. A QoS device may be capable of negotiating with a system resource manager for varying amounts of bandwidth.

As used herein the term "HLS" or "HTTP Live Streaming" may refer to a protocol for HTTP-based media streaming communications protocol that is available from Apple Inc. as part of their QuickTime, Safari, OS X, and iOS software. HLS generally segments the broadcast stream into a sequence of smaller HTTP-based file downloads, and may utilize ABS. Information concerning the content may be provided in the HLS stream. For example, in the header at the start of the streaming session, an extended M3U playlist containing the metadata for the various available sub-streams may be downloaded.

As used herein the term "segment(s)", "chunk(s)" or "fragments" may refer to the segmenting of direct linear and fiber connect high bit rate streams into segments that are encrypted in various formats, tagged, and/or otherwise packaged to prepare the content for ABR streaming in the IPDN system. Media segments may be delivered in real-time, near real-time or delivery (to account for network blocks, conservation of network resources or other use-cases). Media Segments may be video encapsulated in a format used to traverse the network and then made available for playback via a media player, though the segments could encompass other media types such as just audio, images, web hyperlinks, etc. Media Segments may consist of a program based on a time boundary. The program may be interspersed with other Media Segments such as for an advertisement, blackout/alternate content or other customized programming within the program boundary. Segmenting may be performed in the IPDN system by the "Packager", which may refer to a device used for segmenting the content or video for ABR, for example, segmenting in 6 second portions with I frames at each end. The packaging in the IPDN system may function to tune and optimize the content being ingested, to encrypt the segments in conjunction with any DRM policies and rights, and to condition the ABR stream for tag, ad marking and the like. Streaming formats may include MP4, MOV, QT, M4V, 3GP, 3G2, MP4 (For Most of Cell phones), and many other formats: MPEG Video (MPEG-1, 2, 4, TS, TP), Flash (FLV, SWF), DVD, Windows Media (WMV, AVI), Audio (MP3, WMA, AIFF) so as to convert the audio and video useful formats for personal use, including MOV, M4V, MP4, WMV, MKV, AVI, XviD, MPEG, DVD-Video, FLV, 3GP, and many others.

This disclosure relates to a boundary content data capture system and method for recording and storing pre- and post-broadcast information and/or metadata of media content on the broadcast scheduled boundary of media content. The boundary content data capture system and method may provide a user the ability to identify, obtain, and store pre- and post-broadcast media content in the recording of linear and non-linear content media (e.g., TV broadcast programs, VOD, and digital video). The boundary content data capture system and method may be implemented in a CDN or system using computers to distribute copies of data placed at various nodes of a network by subscription to the device of a user by pulling ABR segments from storage available on the CDN.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 depicts a guide 100 illustrating content that may be recorded by a system for capturing border metadata while recording content. Such a system may be one or more of the systems of FIGS. 3, 4, 8, and/or 9.

The guide 100 is illustrated in the form of a grid of channels (including a channel A 101, a channel B 102, and a channel C 103) and times (6:00 PM, 6:30 PM, and 7:00 PM). As shown, a channel broadcast and/or other linear broadcast or content stream associated with channel A 101 may include content 104 "Football Game" airing at 6:00 PM, content 107 "Talent Contest" airing at 6:30 PM, and content 110 "Movie A" airing at 7:00 PM. Similarly, a channel broadcast and/or other linear broadcast or content stream associated with channel B 102 may include content 105 "SitCom 1" airing at 6:00 PM, content 108 "Cop Drama" airing at 6:30 PM, and content 111 "Baseball Game" airing at 7:00 PM. Likewise, a channel broadcast and/or other linear broadcast or content stream associated with channel C 103 may include content 106 "News X" airing at 6:00 PM, content 109 "Cartoon" airing at 6:30 PM, and content 112 "Boxing Match" airing at 7:00 PM. The broadcasts may include metadata for one or more of the illustrated instances of content, such as the titles, time information, and channel information used to generate the guide 100 as shown. One of more of the instances of content may be recorded by a system for capturing border metadata while recording content.

Figure 2A:
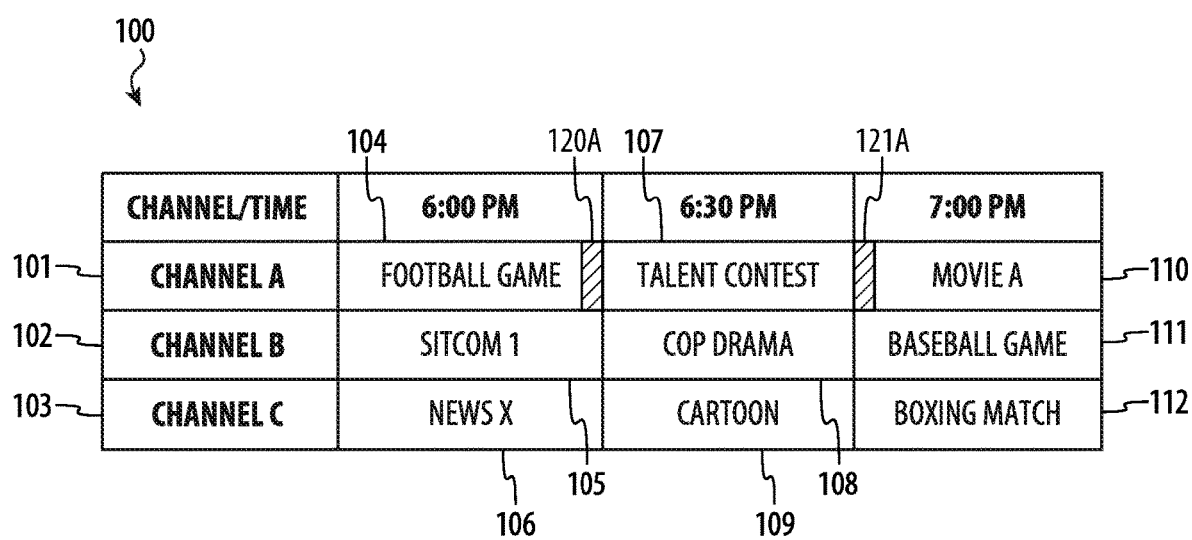
FIG. 2A depicts a first example illustrating capture of border metadata while recording content from the guide depicted in FIG. 1.

FIG. 2A depicts a first example illustrating capture of border metadata while recording content from the guide 100 depicted in FIG. 1. In this first example, content 107 is recorded. A border 120A or other region previous to the content 107 in the broadcast associated with channel A 101 is also recorded. This border 120A includes a portion (such as three minutes) of content 104. Further, in this first example, a border 121A or other region subsequent to the content 107 in the broadcast associated with channel A 101 is recorded. This border 121A includes a portion (such as two minutes) of content 110.

Metadata for the border 120A corresponding to the content 104 and/or the border 121A corresponding to the content 110 (and/or the content 107) may also be included in the recording and/or otherwise recorded. In this way, when the recording is accessed to present the content 107 and portions of the content 104 and/or the content 110 are also presented, metadata regarding the content 104 and/or the content 110 may be accessed and/or presented. This may allow a user to find out more about programs bordering programs they record that they may become curious about.

Figure 2B:
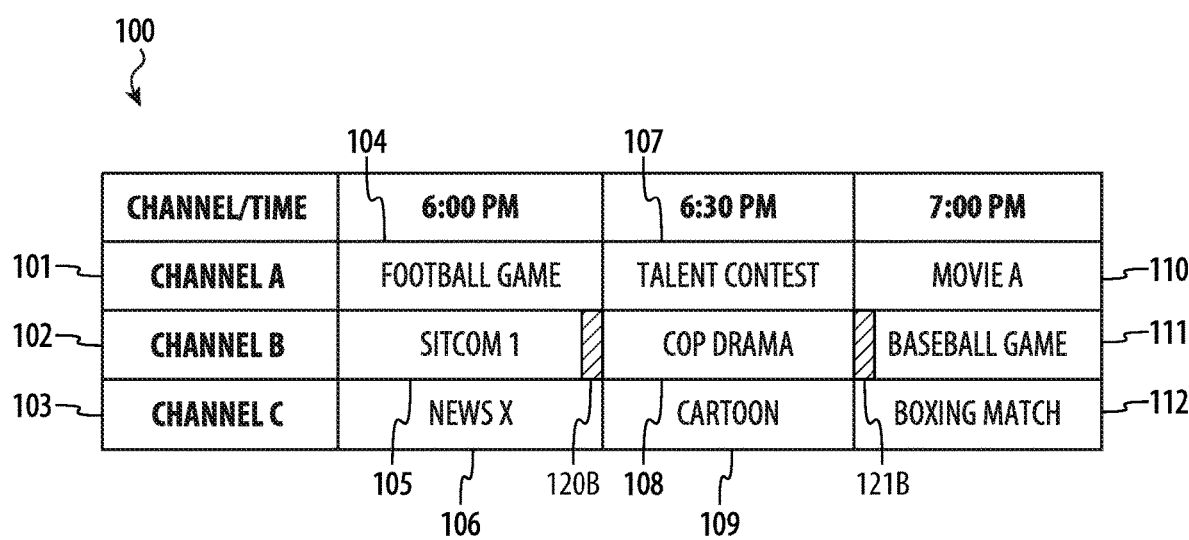
FIG. 2B depicts a second example illustrating capture of border metadata while recording content from the guide depicted in FIG. 1.
Figure 2C:
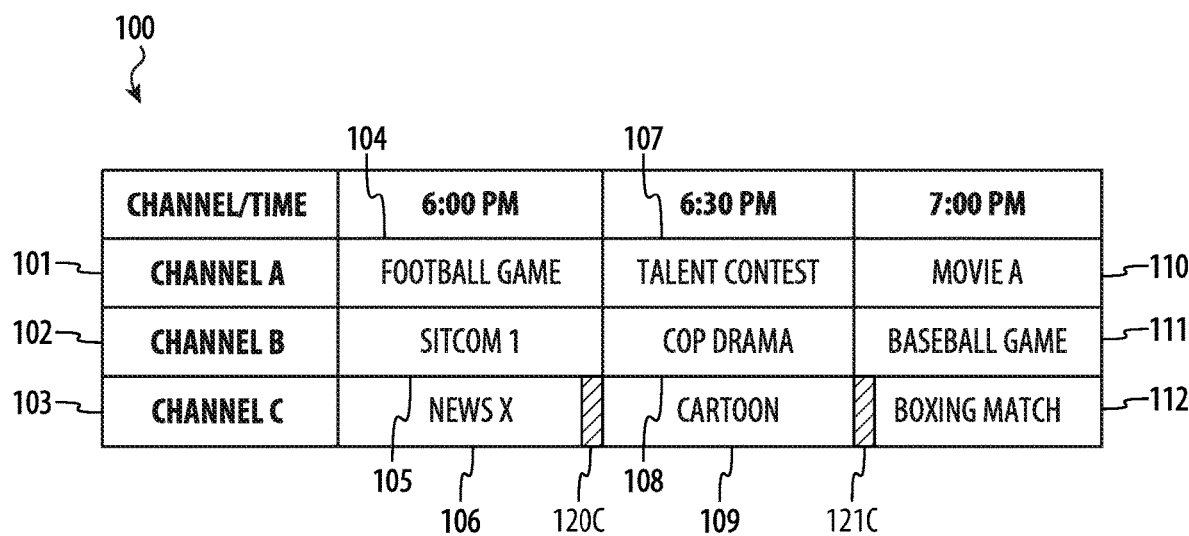
FIG. 2C depicts a third example illustrating capture of border metadata while recording content from the guide depicted in FIG. 1.

FIG. 2B depicts a second example illustrating capture of border metadata while recording content from the guide 100 depicted in FIG. 1. In this second example, content 108 is recorded along with borders 120B (including a portion of content 105) and 121B (including a portion of content 111) and corresponding metadata. FIG. 2C depicts a third example illustrating capture of border metadata while recording content from the guide 100 depicted in FIG. 1. In this third example, content 109 is recorded along with borders 120C (including a portion of content 105) and 121C (including a portion of content 112) and corresponding metadata.

In some implementations, the content discussed with respect to FIGS. 1-2C may be broadcast as part of the channel broadcasts and/or other linear broadcasts or content streams to a device that performs the recording, along with the related metadata. Such a device may be a user device such as a set top box or other content access device, a content provider device such as an nDVR, and/or any other kind of device capable of receiving and storing and/or presenting content. However, in other implementations, another device may separate one or more instances of content from the channel broadcast and route the content to the device that performs the recording.

Further, although the above describes the metadata as received with the content, it is understood that this is an example. In some implementations, the recording or other device may obtain the metadata from a source other than the source of the content (such as in implementations where metadata is not part of broadcasts, where metadata is part of broadcasts but is missing or corrupt, and so on). For example, a device may query a server on the Internet that maintains television listings based on the time and channel associated with received content in order to facilitate obtaining metadata for that content.

Additionally, although the above describes the metadata as recorded at the same time as the content, it is understood that this is an example. In various implementations, the metadata may be recorded after the content is recorded, whether in the same recording as the content and/or stored elsewhere. Borders may similarly be recorded at different times than the content is recorded. Various configurations are possible and contemplated.

Moreover, although the above describes recording all metadata corresponding to any content that is recorded, it is understood that this is an example. In some implementations, metadata may correspond to various portions of content. If such portions are not included in a recording, related metadata may be discarded. This may minimize storage space used for recordings.

Figure 3:
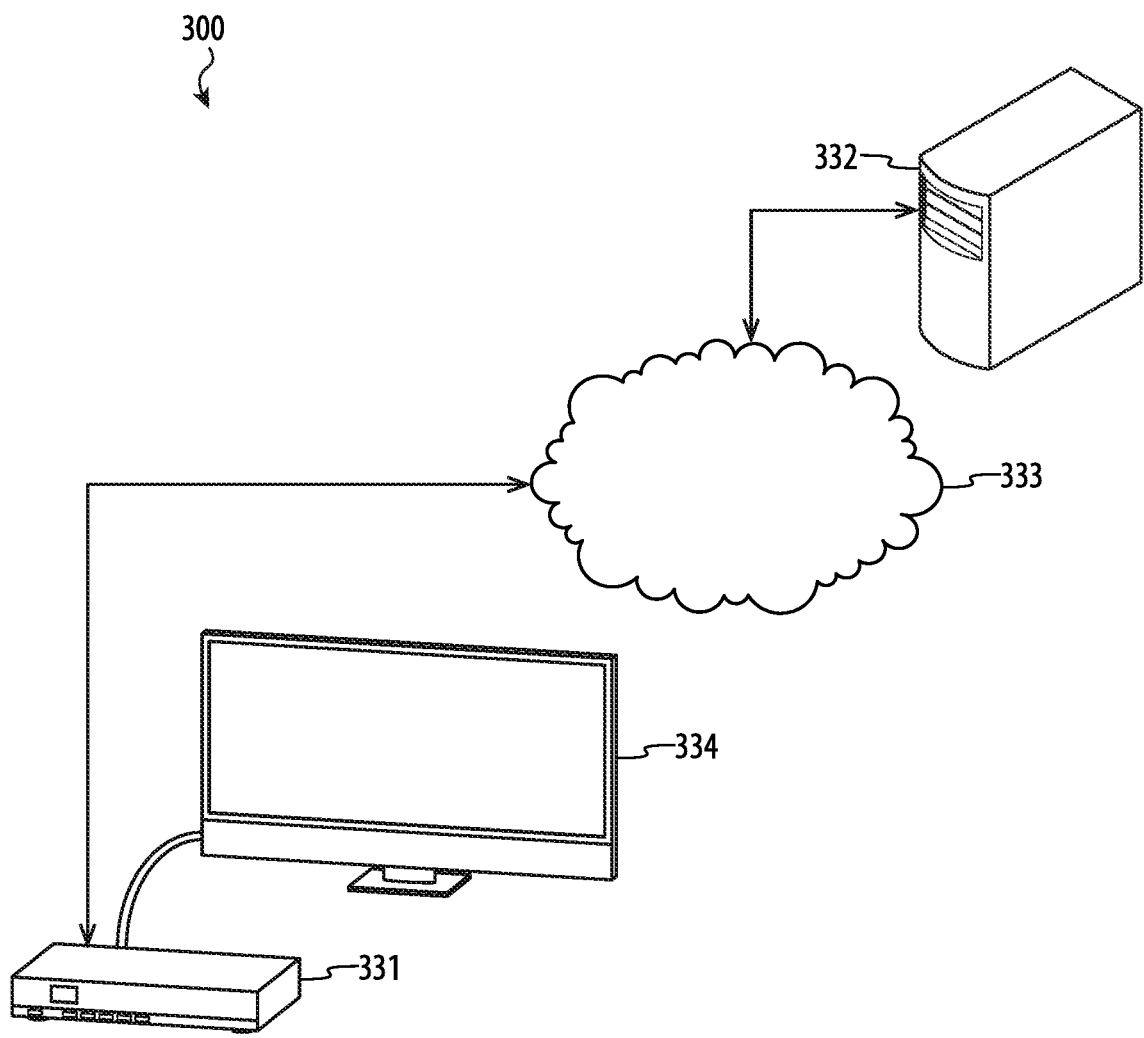
FIG. 3 depicts a system for capturing border metadata while recording content.

FIG. 3 depicts a system 300 for capturing border metadata while recording content. One or more components of the system 300 (such as the user content access device 331, the content provider device 332, and so on) may perform one or more of the recordings described above with respect to FIGS. 1-2C.

The system 300 may include a user content access device 331 that communicates with one or more content provider devices 332 via a communication network 333. The communication network 333 may be any kind of dedicated and/or general purpose network such as a content provider cable network, a satellite network, a cellular communication network, the Internet, and so on.

As shown, the content access device 331 may be a set top box that is operable to receive content from the content provider device 332, store such content, and/or present such content (such as on an associated television 334, an integrated display, and so on). However, it is understood that this is an example. In various implementations, the content access device 331 may be any kind of device capable of receiving, storing, and/or presenting content. Examples of such devices may include, but are not limited to, a desktop computing device, a mobile computing device, a smart phone, a tablet computing device, a cellular phone, a laptop computing device, a wearable device, a television, and so on.

Figure 4:
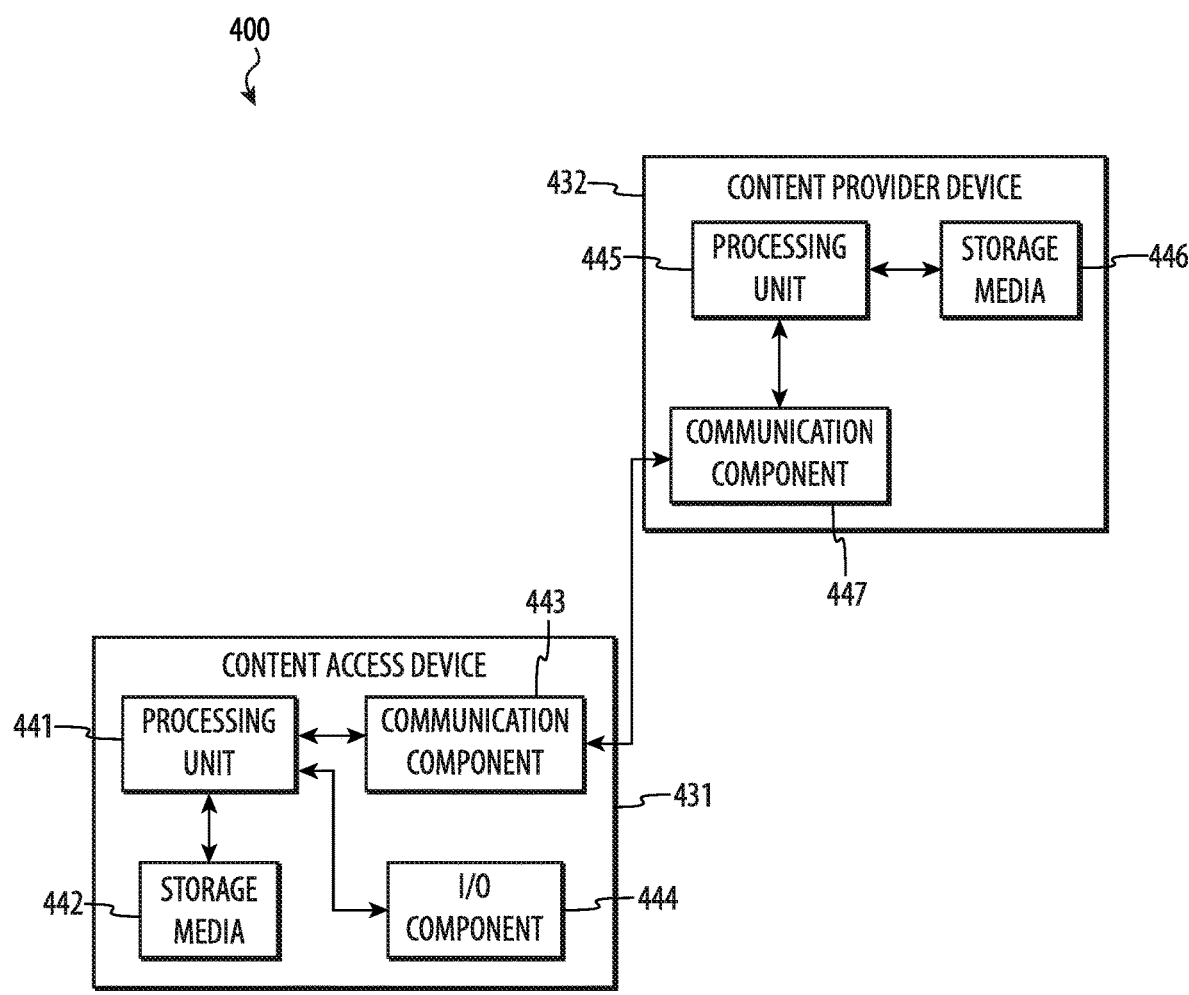
FIG. 4 depicts a block diagram illustrating components and relationships of a system for capturing border metadata while recording content. The system may be the system of FIG. 3.

FIG. 4 depicts a block diagram illustrating components and relationships of a system 400 for capturing border metadata while recording content. The system 400 may be the system 300 of FIG. 3. The system 400 may include one or more content access devices 431 and one or more content provider devices 432 that are operable to communicate with each other.

The content access device 431 may include one or more processing units 441, non-transitory storage media 442 (which may take the form of, but is not limited to, a magnetic storage medium; optical storage medium; magneto-optical storage medium; read only memory; random access memory; erasable programmable memory; flash memory; and so on), communication components 443, input/output components 444 (such as one or more displays, speakers, touch screens, keyboards, computing device mice, interfaces for such, and so on), and so on. Similarly, the content provider device 432 may include one or more processing units 445, non-transitory storage media 446, communication components 447, and so on.

In various embodiments, the content access device 431 and/or the content provider device 432 may be operable as a digital video recorder device. For example, the processing unit 441 may execute instructions stored in the non-transitory storage media 442 (and/or the processing unit 445 may execute instructions stored in the non-transitory storage media 446) to record an instance of content that is broadcast as part of a content stream including an additional instance of content adjacent to the instance of content, include a border in the recording that includes a portion of the additional instance of content, store metadata related to the additional instance of content, and provide the metadata related to the additional instance of content upon request during access of the recording.

In some examples, the processing unit 441 (and/or the processing unit 445) provides the metadata while presenting the portion of the additional instance of content from the recording. In some cases of such examples, the processing unit 441 (and/or the processing unit 445) provides the metadata to identify the additional instance of content.

In numerous examples, the additional instance of content is previous to the instance of content in the content stream. In various examples, the border accommodates a broadcast schedule deviation for the instance of content. In some examples, the metadata includes a description of the additional instance of content. In various examples, the border is less than five minutes of the content stream.

In various embodiments, the content access device 431 and/or the content provider device 432 may be components in a digital video recorder system. For example, the processing unit 441 may execute instructions stored in the non-transitory storage media 442 (and/or the processing unit 445 may execute instructions stored in the non-transitory storage media 446) to, in response to a user request, record first content from a channel broadcast that includes second content adjacent to the first content and store a border around the first content that includes a portion of the second content and metadata related to the second content.

In some examples, the processing unit 441 (and/or the processing unit 445) receives a request for the metadata during presentation of the recording and provides the metadata. In various examples, the processing unit 441 (and/or the processing unit 445) provides the metadata as part of presenting programming guide information. In numerous examples, the processing unit 441 (and/or the processing unit 445) discards additional metadata from the channel broadcast. In some examples, the processing unit 441 (and/or the processing unit 445) records the first content from the channel broadcast by recording the channel broadcast during a time period associated with the first content.

In various examples, the second content is subsequent to the first content in the channel broadcast. In some examples, the non-transitory storage medium 442 and the processing unit 441 are components of the user content access device 431 that is operable to receive the channel broadcast from the content provider device 432.

In various embodiments, the content access device 431 and/or the content provider device 432 may perform a method for operating a digital video recorder. Such a method may include storing content received as part of a linear broadcast as a recording in a non-transitory storage medium (such as the non-transitory storage medium 442 or the non-transitory storage medium 446), adding a border to the recording that includes a portion of additional content that is adjacent to the content in the linear broadcast, obtaining metadata for the additional content, and including the metadata in the recording.

In some examples of such a method, obtaining the metadata for the additional content may include obtaining the metadata for the additional content from a source other than the linear broadcast. The source may be an internet. In various examples, obtaining the metadata for the additional content may include obtaining the metadata for the additional content after adding the border to the recording.

In numerous examples, adding the border to the recording is performed at a same time as storing the content. In some examples, such a method may further include presenting the content from the recording on demand.

Figure 5:
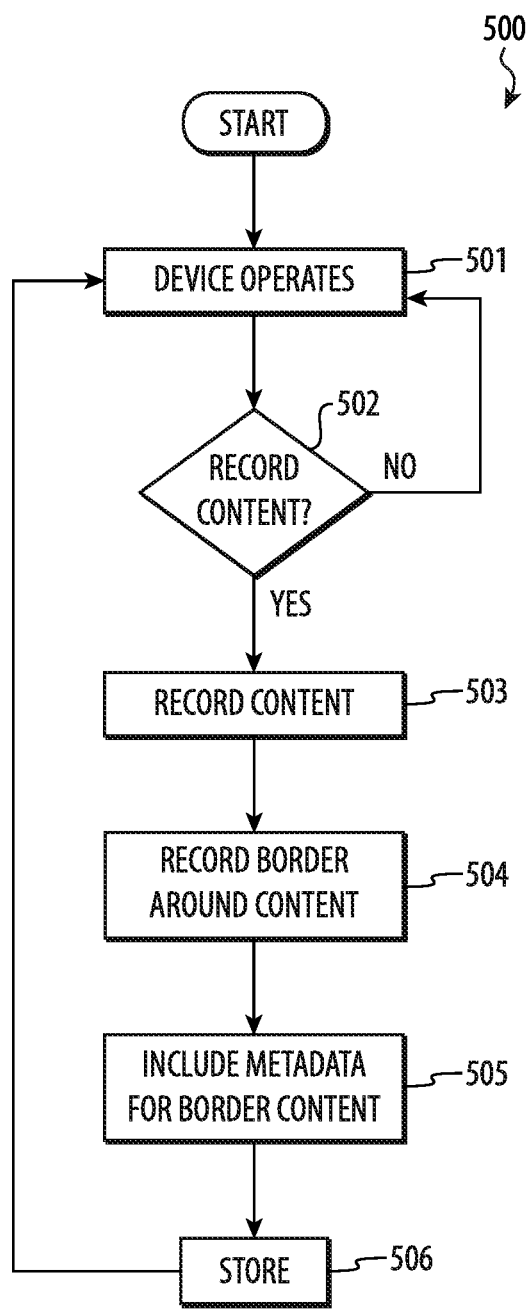
FIG. 5 depicts a flow chart illustrating a first example method for capturing border metadata while recording content. The first example method may be performed by one or more of the systems of FIGS. 3, 4, 8, and/or 9.

FIG. 5 depicts a flow chart illustrating a first example method 500 for capturing border metadata while recording content. The first example method 500 may be performed by one or more of the systems 300, 400, and/or 800 of FIGS. 3, 4, 8, and/or 9.

The flow begins at 501 where a device operates. The flow then proceeds to 502 where the device determines whether or not to record content from a channel broadcast and/or other linear broadcast or content stream. The device may determine whether or not to record content based on receipt of user input, reaching a time corresponding to a recording instruction, triggering of a recording instruction, and so on. If so, the flow proceeds to 503. Otherwise, the flow returns to 501 where the device continues to operate.

At 503, the device records the content. The flow then proceeds to 504 where the device records a border around the content from the channel broadcast and/or other linear broadcast or content stream. The border may be before the content and/or after the content. The flow then proceeds to 505 where the device includes metadata for the border content in the recording.

Subsequently, the flow proceeds to 506 where the device stores the content. Next, the flow returns to 501 where the device continues to operate.

Although the first example method 500 is illustrated and described as including particular operations performed in a particular order, it is understood that this is an example. In various implementations, various orders of the same, similar, and/or different operations may be performed without departing from the scope of the present disclosure.

For example, the first example method 500 may include one or more additional operations. In some implementations, the first example method 500 may include the operation of requesting the metadata for the border content. In such implementations, the metadata may not be received with the content and may thus be requested to be included. Alternatively, the metadata may normally be received with the content but may be missing or otherwise unusable (such as in cases where received metadata is corrupt) and a request may be made to obtain the missing metadata.

In some implementations, the metadata may be obtained and recorded after the content has already been recorded. The device may record content with a border, analyze the border to determine metadata is not present for the border, obtain the metadata, and record the obtained metadata in a way that is associated with the recorded content. Various configurations are possible and contemplated.

Figure 6:
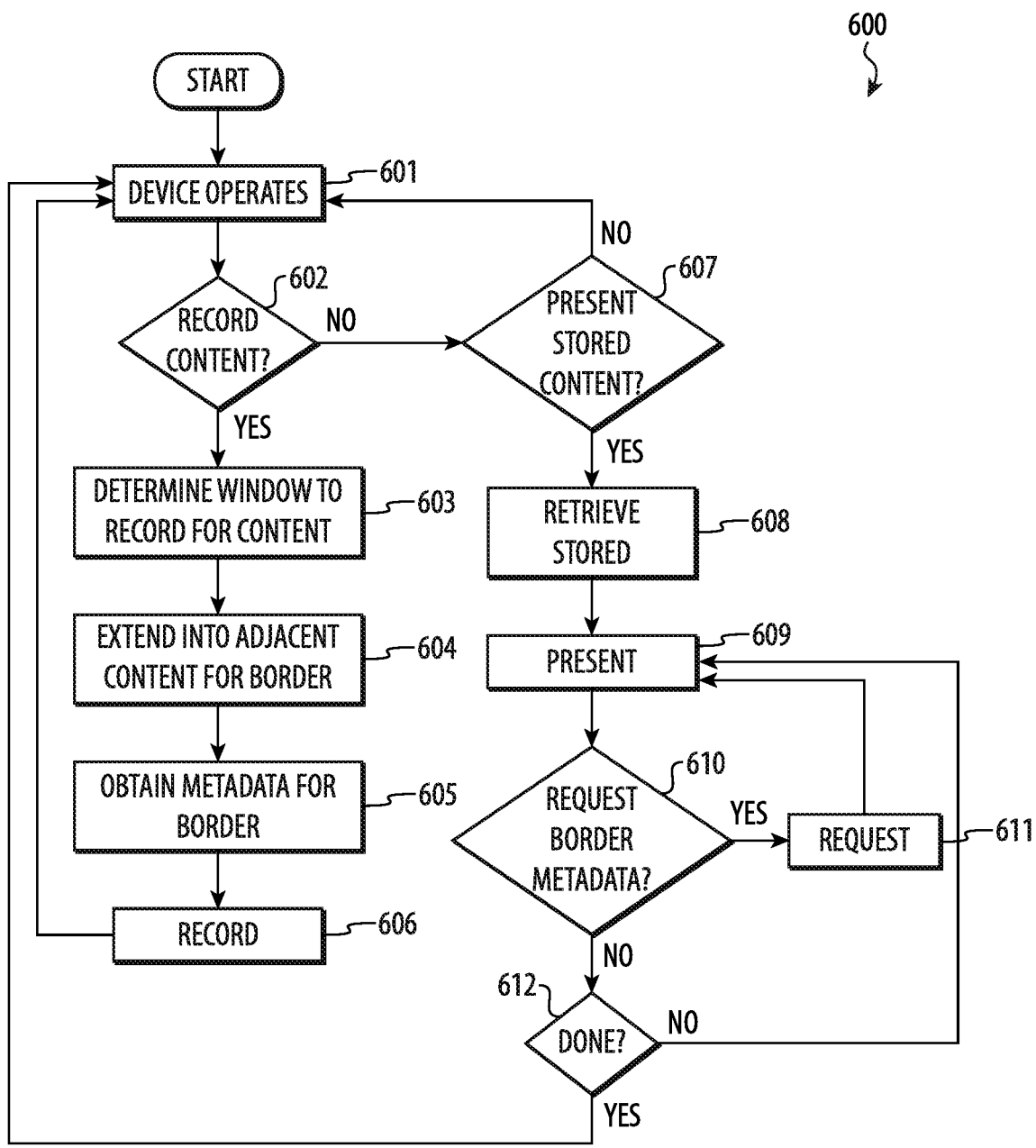
FIG. 6 depicts a flow chart illustrating a second example method for capturing border metadata while recording content. The second example method may be performed by one or more of the systems of FIGS. 3, 4, 8, and/or 9.

FIG. 6 depicts a flow chart illustrating a second example method 600 for capturing border metadata while recording content. The second example method 600 may be performed by one or more of the systems 300, 400, and/or 800 of FIGS. 3, 4, 8, and/or 9.

The flow begins at 601 where a device operates. The flow then proceeds to 602 where the device determines whether or not to record content from a channel broadcast and/or other linear broadcast or content stream. If so, the flow proceeds to 603. Otherwise, the flow proceeds to 607.

At 603, after the device determines to record the content, the device determines a window to record for the content. The window may be a time frame within which the content is to air. For example, the content may have a start time and an end time. The flow then proceeds to 604 where the device extends the window into adjacent content in the channel broadcast and/or other linear broadcast or content stream for a border. The window may be extended into adjacent content previous to the content and/or subsequent to the content. The flow then proceeds to 605 where the device obtains metadata for the border. Subsequently, the flow proceeds to 606 where the device records all content corresponding to the window along with the metadata. Next, the flow returns to 601 where the device continues to operate.

At 607, after the device determines not to record the content, the device determines whether or not to present stored content. If so, the flow proceeds to 608. Otherwise, the flow returns to 601 where the device continues to operate.

At 608, the device retrieves the stored content. The flow then proceeds to 609 where the device presents the retrieved content.

Next, the flow proceeds to 610 where the device determines whether or not border metadata is requested. Border metadata may be requested via user input, one or more displays presented while presenting border content that display information related to border content, and so on. If so, at 611 the device requests the border metadata and the flow returns to 609 where the presentation of the retrieved content is updated based on the requested border metadata. Otherwise, the flow proceeds to 612.

At 612, the device determines whether or not presentation of the retrieved content is finished. Presentation of content may be finished when the entirety of the content has been presented, in response to a user instruction to end presentation, and so on. If not, the flow returns to 609 where the device continues presenting the retrieved content. Otherwise, the flow returns to 601 where the device continues to operate.

Although the second example method 600 is illustrated and described as including particular operations performed in a particular order, it is understood that this is an example. In various implementations, various orders of the same, similar, and/or different operations may be performed without departing from the scope of the present disclosure.

For example, the second example method 600 is illustrated and described as recording the content, border, and metadata at the same time. However, in various implementations, these various components may be recorded in various places at various times without departing from the scope of the present disclosure.

In a particular implementation (with respect to a process 700 shown in FIG. 700 that may be performed by a system 800 shown in FIGS. 8 and 9), a boundary content data capture system 800 may be configured to display media content for digital recording in a guide or schedule format to a subscriber who uses the guide to select a particular channel for recording by nDVR or DVR in a device.

For example, the subscriber may be presented with numerous channels A, B, C, . . . Ni in a programming schedule according to time slots for viewing and make user inputs as desired. The subscriber may select a particular channel for recording at a predetermined time (i.e., 6:30-7:00 PM) to record a program. The digital recorder may be set with a pre-recording time of two minutes before the predetermined time (i.e., 6:28 PM) and a post-recording time to end recording two minutes after the predetermined time (i.e., 7:02 PM). When the playback of the program is viewed by the user, the two minute segment of a previous adjacent program may be displayed for the pre-recording time. Similarly, the two minute segment of a subsequent adjacent program may be displayed for the post-recording time. In some systems, the metadata for the pre-recording time or the post-recording time may not be available for the user to answer the question "what is that program?"

However, the system 800 may be configured to add file information and/or metadata regarding the pre-recording time or the post-recording time to the recording. In this manner the user can answer the questions related to programs represented in the pre-recording time or the post-recording time. The file information and/or metadata may be obtained from a manifest file or from a HLS header file transmitted with encoded ABS segments pulled from a CDN 851. Moreover, if no information is available in the header file, the system 800 may be configured to search publicly available sources of information for such specific file information and/or metadata to associate with various content. For example, the system 800 may search the channel, predetermined time, and geo-location as content (such as a sporting event) may be scheduled in advance. Accordingly, in this additional embodiment, multiple segments with unknown file information and/or metadata may be associated with the recorded nonlinear and linear media content 853, 854, respectively, so that the user may access such file information and/or metadata.

The system 800 may be configured with a video core 852 adapted for content processing and communication for ingesting and packaging linear content 853 (e.g., live broadcasting) and non-linear (e.g., VOD) content 854 by communication lines 856 across a communication network or CDN 851 to the video edge 855 to service a device 831 (e.g., set top box, tablet, smart phone, computer, etc.) of a user that subscribes to a content subscription service. The video core 852 in the content processing and communication system may also communicate with a resource manager 850 over communication lines 857 to provide information about the ingested and packaged linear content 853 and non-linear content 854 such as, for example, by maintaining a manifest file. The manifest file may identify and store media content 853, 854 information and/or metadata in the manifest file for the media content. For example, the manifest file may capture metadata information from the start of broadcast media content from the HLS header information and store it in network storage. The system 800 may also include a back office 861 with business operations 862 (e.g., regulations, licenses, etc.), e-commerce 863 (e.g., subscriber billing, payments, etc.) and a self-care 864 portal (e.g., updates, remote servicing of devices, etc.). The user experience platform (UX) 858 may be a multi-dimensional platform to present content media to the user in a predetermined graphical user interface (GUI). A digital rights management (DRM) interface 968 may be adapted to interface with the user device 831.

The resource manager 850 may be responsible for allocating, monitoring, and controlling resources, particularly pulling ABR segments and bandwidth therefor, for recording and playback related services. The resource manager 850 may utilize a token restriction check 982 to authorize viewing of copyrighted content according to policies and rights management across the CDN 851. According to one embodiment, the content media may be, for example, linear broadcasting and non-linear or VOD content media 853, 854 (e.g., audio and podcast hosting, video delivery, live streaming, flash streaming), downloadable objects (media files, software, documents), live broadcast linear and database queries. Numerous devices may be available for a user to play the content media such as TV, HD-monitors, and mobile devices. The system 800 may be formed and implemented using a DVR integrated device (e.g., a set top box) and/or an nDVR.

A CDN 851 system may be configured as described in U.S. patent application Ser. No. 14/765,575 entitled System and Method of Distributing Content Based On Trending and Preemptive Data, which is incorporated by reference in its entirety. In an embodiment of the disclosure, when recording TV, video, and/or movie content media files, the video core 852 may ingest linear and non-linear content 853, 854 and package such to encode in one or more media content segments for distribution across the CDN 851, for example, using ABS. The media content segments may not be multicast or broadcast to the end client, but may be retrieved by an active request to pull them (for instance, using HTTP GET request) from the network serving device.

According to an embodiment, the system 800 may be configured to transmit and store the content media segments and file information using HLS protocol and ABR technologies for distribution across the CDN 851. In this manner, the system 800 may be formed to use HLS for the file information of the segments of media content pre-timing advantages of ABR by dynamically monitoring CPU and memory capacity to make corresponding adjustments in the video quality of the transmitted content media by encoding the source linear and non-linear content 853, 854 (e.g., live broadcast, movie, video, etc.) at varying bit rates, and then segmenting each of the different bit rate streams. The segment length may be a predetermined size and duration (for example, between 2 and 10 seconds). The client or user's device 831 may include a player 984 to use the ABR advantageously to switch among the different bit rate segments, thereby locating the segments that correspond best to the bandwidth. In this manner, the system 800 may make use of improved CDN efficiencies using technologies such as ABR, fragmented MPEG-4 files, or other formats that can be delivered via download technology so as to utilize the HTTP information file or file header to provide information and/or metadata regarding the media content 853, 854 for later reference by the user.

The resource manager 850 may be responsible for allocating, monitoring, and controlling resources, particularly pulling ABR segments and bandwidth therefor, for recording and playback related services. The resource manager 850 may integrate an nDVR 859 for the recording and/or playback of linear and non-linear content 853, 854 by the video control 860. According to a DVR embodiment, the device 831 may integrate a DVR 879 for the recording and/or playback of linear and non-linear content 853, 854 in storage on the device 831. The DVR function may allow for starting the recording earlier (i.e., a pre-recording time) and ending later (i.e., a post-recording time) as, among other things, (1) broadcasters may present different formats on programming changeover so as to maximize advertising opportunities; or (2) because of variations in the time clock of the network and the device 831. Apart from variations in the network and device 831 clocks, certain devices 831 establish in the device 831 set-up (1) a begin recording period to begin recording a channel stream (e.g., 1, 2, 3, 4, 5, 10, 15 etc. minutes) and (2) an end recording period to end recording the channel stream (e.g., 1, 2, 3, 4, 5, 10, 15 etc. minutes). This may be to compensate for factors such as advertisement schemes, broadcasting start schemes, live events extending beyond the allotted time (i.e., added time, overtime, extra innings, etc.) as well as the clock variations of the network and device 831. It is to be appreciated that the desired ABR segment of media content 853, 854 may be pulled from storage on CDN 851 and supplied or otherwise communicated to the nDVR 859 resource in the cloud and DVR 879 on the device 831 for the user.

According to an embodiment, the system 800 may be configured to transfer information in the segments or in one or more multiple bit rate segments and file information of the content media files (e.g., media segments representing frames of video or other programming) by way of HLS to transfer and deliver across the CDN 851 from the video core 852 to the video edge 855 closest to the client device 831. The system 800 may be configured to use ABR technologies to identify file information of transmitted content media files using HLS or other HTTP protocols for distribution across the communications network, for example, a private CDN 851.

The system 800 may be configured to provide file information about pre- and post-broadcast media content 853, 854 in situations when a user decides to store for later viewing, or use the DVR 879 or nDVR 859, to record a desired scheduled broadcast media content 853, 854. The recording may capture pre- and post-broadcast media content 853, 854 transmitted. For example, small amounts of pre- and post-broadcast media content 853, 854 may be stored by DVR systems when the recording and storage begins a predetermined period prior to the scheduled broadcast media content 853, 854, and ends a predetermined period after the scheduled broadcast media content 853, 854, so as to ensure the capture of the entire scheduled broadcast media content 853, 854. When the recorded scheduled broadcast media content 853, 854 is viewed and of interest to the user, the user advantageously may obtain file information for the pre- and post-media content 853, 854 overcoming disadvantages with other systems that may not capture the pre- and/or post-media content 853, 854 file information and/or metadata.

According to an embodiment of the disclosure, the video core 852 may be configured to ingest, segment and package the input linear and non-linear media content 853, 854 into ABR segments for later pulling ABR segments across CDN 851 to the video edge 855 for accessing by the user's device 831. A catalog of file information, metadata and other information about the content 853, 854 may be written into a manifest file that may be stored on a resource manager 850 for video control 860. When the user accesses the content media file(s) 853, 854, the user's device 831 may request the segments from the CDN by an address given in the manifest file. The resource manager 850 may control pulling of ABR segments of content media file(s) 853, 854 for the user's device for playback and display.

The system 800 may use the advantages of ABR by dynamically monitoring CPU and memory capacity to make corresponding adjustments in the video quality of the transmitted content media by encoding the source linear and non-linear content (e.g., live broadcast, movie, video, etc.) at varying bit rates, and then segmenting each of the different bit rate segments. The media segment length may be a predetermined size and duration, for example, between 2 and 10 seconds. The client or user's device 831 may include a player 984 to use the ABR advantageously to switch among the different bit rate segments, thereby locating the segments that correspond best to the bandwidth. The player 984 in the device 831 may be configured to play the linear and non-linear content 853, 854 media file(s) to create an optimum user experience.

In an exemplary embodiment, a user may have a device 831 (e.g., a set top box or satellite DVR receiver) which may have application software 980 loaded in memory. In establishing a recording, the device 831 may check with a gatekeeper 967 module to determine the user's privileges, the user's metadata, the lineup data, perform a restrictions check such as passing an authorization token, and also may be used to purchase media content. The application software 980 may be configured as one or more APIs. The application software 980 may be configured with a browser 981, a DVR 879, an authorization restriction or token restriction check 982, a digital rights management (DRM) module 983, and a content media player 984. The application software 980 may be adapted to log in to the gatekeeper 967 module of the resource manager 850. The gatekeeper 967 may also utilize APIs for various subscriber data services for policies of acquisition, persistence, and consumption for the media content that may be established by the back office 861. The gatekeeper 967 may be used in recording linear and non-linear media content 853, 854 including a lineup API 975, login API 976, playback API 977 and purchase API 978. The DVR functionality may be configured to pull ABR segments by assembling media segments to create a temporal viewing experience (such as time shifting) by reassembling the segments into the original order of the content program being viewed at an alternate time from the original airdate of the program. Pulled media segments may be delivered to the device 831 via resource manager 850 by the device 831 making an active request to retrieve those segments from the CDN 851.

The scheduler service 966 may be utilized by the system 800 when the user schedules the DVR and may be implemented including a scheduler API 973 and a scheduler database 974. The scheduler service 966 may be utilized to operate in connection with the resource manager 850 to create program schedule information, whereby the scheduler service 966 may be configured to provide a catalog of media content data to display to the user in response to the user communicating a selection to the resource manager 850. The scheduler service 966 may be configured to communicate with the resource manager 850, the device 831 of the user, a gatekeeper 967 for effectuating policies associated with the user and/or user's subscription, and a catalog service 965. The user may utilize the scheduler service 966 to specify channels to view from the guide or line-up displayed, user privileges, and other settings (e.g., such as DVR settings and preferences default DVR scheduling settings. The scheduler service 966 may check with the gatekeeper 967 for authentication, entitlement check, and other account data for the particular user. The catalog service 965 may provide metadata information about the media content that may be stored in a metadata database 969. Search capabilities may be provided using a search database 970. The catalog service 965 may be implemented in a software program or catalog API 971. Scheduling of the recording of the media segments may occur either in the local host or the cloud/server side program scheduler. The DVR functionality of pulling ABR segments may be utilized to reduce system overhead in the delivery to the device 831 of the subscriber or user. Moreover, such resources may be utilized for other functions such as, for example, forming multiple ABR segments of the highest resolution on the ingestion of high bit rate video.

According to an embodiment, the system 800 may be configured to transfer HLS segments of media content in an ABR manner across the CDN 851 from the video core 852 to the video edge 855 closest to the client device 831. In a movie, video or broadcast, frames and/or file information of content media data may be stored in a manifest file. Frames and/or file information of the content media data may occur in a predetermined order based on time.

Some systems for distributing programming by over-the-air TV, cable systems, digital broadcast satellite (DBS) and other CDN sources, such as the system 800, may provide a guide of aggregated media content available. The guide may be a list of channels in a general table or line-up determined by the broadcast network linear programming and published several days before airing, for example, by guide data provided by Tribune Media Services (TMS). However, if the TMS is not available, or there are last-minute substitutions and programming not reflected in the TMS, the system 800 may be configured to locate publicly available guide data.

The resource manager 850 may gather one or more user characteristics from numerous subscriber service requests over a predetermined period of time. The resource manager 850 may be configured to process service requests for metadata file information useful to obtain the one or more user characteristics of a particular media content data. The file information may be useful to identify locations corresponding to media content data in the CDN 851, such as from a manifest file. The resource manager 850 may be configured to determine the one or more user characteristics from the service requests over a predetermined period of time and the file information regarding the particular media content 853, 854. The resource manager 850 may store these user characteristics store in a network storage in the CDN or storage 985 on the device 831, or both.

According to an embodiment of disclosure, the system 800 may be configured to manage the transmission of desired media content over an access link between a device 831 of a user and a source of the media content in the CDN 851 according to the predetermined time of the scheduled broadcast of the program. The CDN 851 may be configured for a content processing and communication system that is communicatively coupled with the resource manager 850. The content processing and communication system may be configured to identify the media content data from a manifest file according to the desired recording established with resource manager 850. The desired recording of program scheduling may involve the resource manager 850 identifying the channel, predetermined time, pre-recording time, and post-recording time from sources in the CDN 851 (for example the resource manager 850, a scheduler service 966 and/or catalog service 965). File information corresponding to media content data 853, 854 may be aggregated in the predetermined arrangement of program scheduling. The resource manager 850 may use the scheduler service 966 to determine scheduling of the digital recording from the guide data or schedule of the predetermined time of the broadcast of the desired program. The resource manager 850 may be configured to pull ABR segments regarding media content data to the device 831 of the user associated with the predetermined time to record the program according to the scheduled broadcast time. For example, the resource manager 850 may be configured to obtain the media content data in the predetermined time for recording a linear media content and nonlinear media content 853, 854 using the resource manager from sources in the CDN 851.

Figure 7:
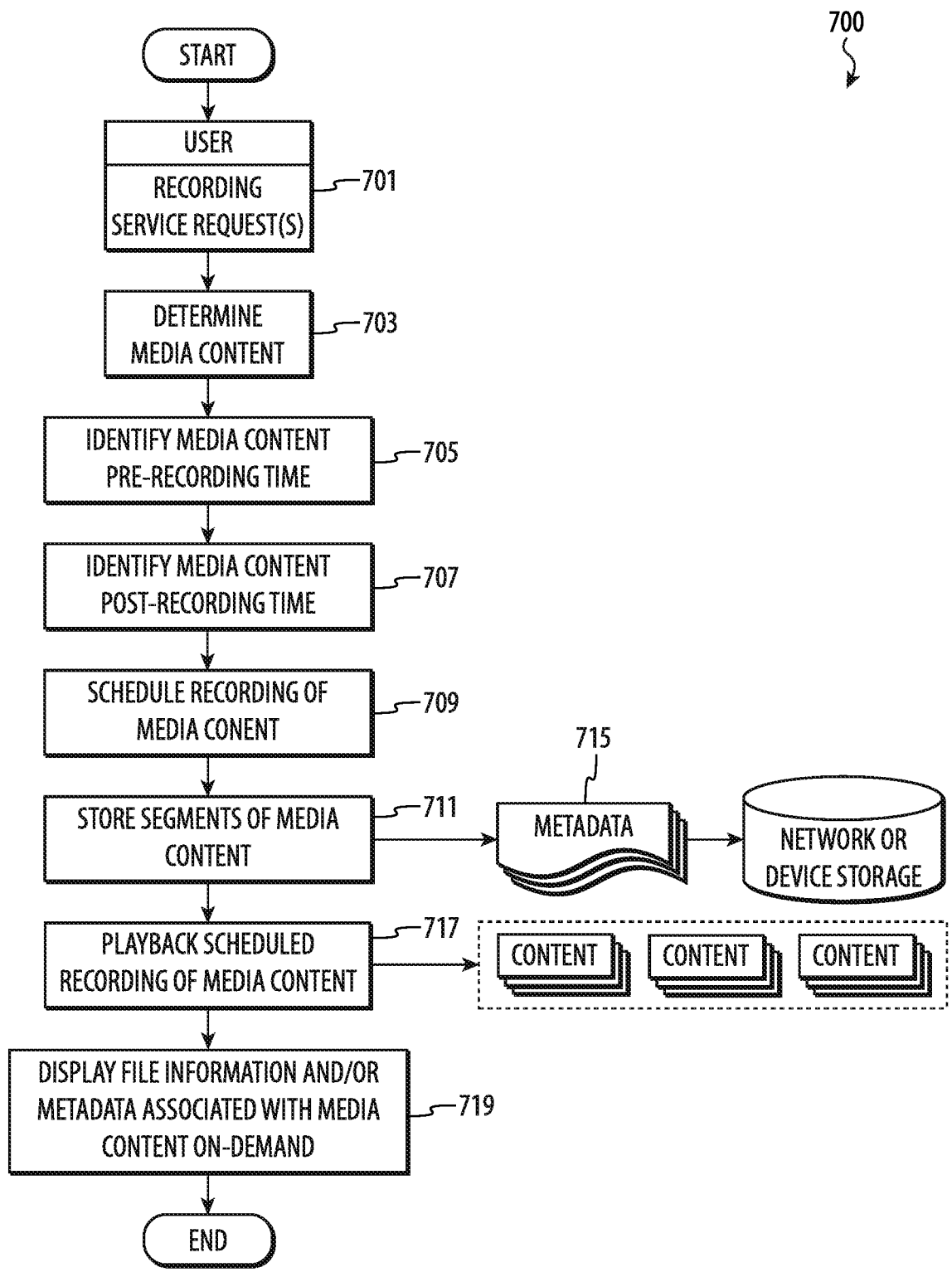
FIG. 7 depicts a boundary information capture process that may be performed by a boundary content data capture system, such as the boundary content data capture system depicted in FIGS. 8 and/or 9.
Figure 8:
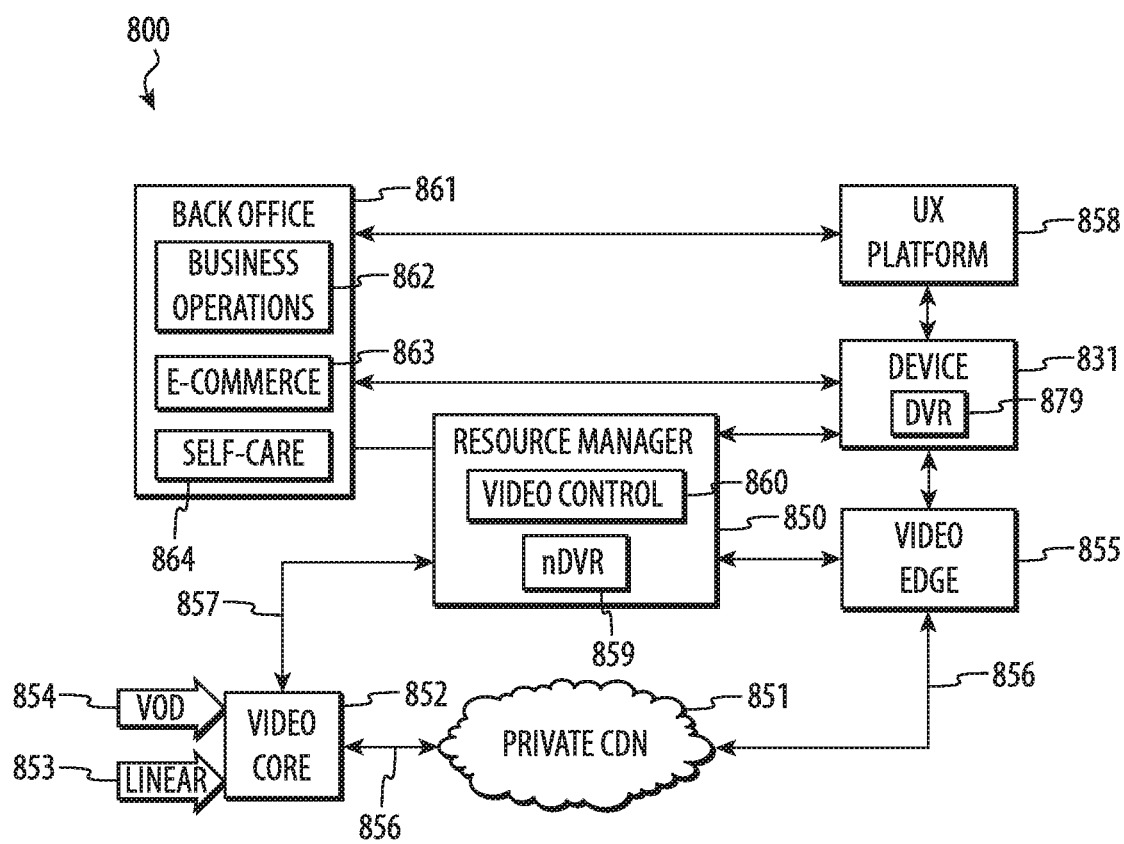
FIG. 8 depicts a block diagram of a first aspect of a boundary content data capture system.
Figure 9:
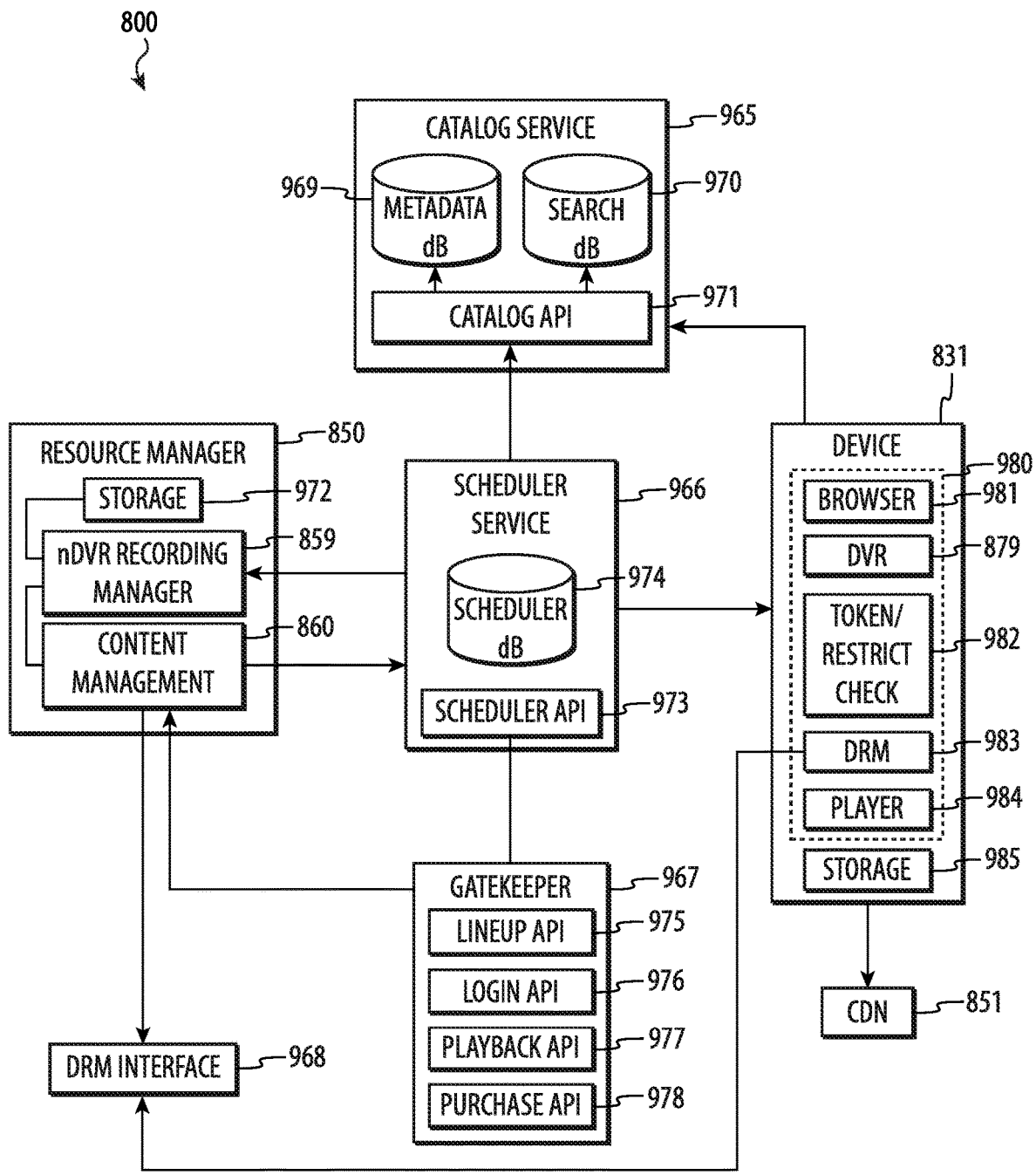
FIG. 9 depicts a block diagram illustrating a second aspect of a boundary content data capture system.

Referring to FIG. 7, in operation, the system 800 may be configured to perform a boundary information capture process 700 using the system 800, CDN 851, resource manager 850, manifest file, catalog service 965, and other aspects of the present disclosure. The boundary information capture process 700 may be implemented by computer-implemented software or one or more APIs interfacing and being controlled by the resource manager 850 such as scheduler API 973 of the scheduler service 966, catalog API 971 of the catalog service 965.

Accordingly, the boundary information capture process 700 may be adapted to record and store pre- and post-broadcast media content information and/or metadata on the boundary of the scheduled broadcast of linear and/or non-linear media content 853, 854. The video core 852 may be adapted to process and segment linear and/or non-linear media content 853, 854 from live broadcast stream into multi-bit rate streams of numerous resolutions, store the streams on the system and have file information of the media content 85, 854 available to the resource manager such as, for example, a manifest file, catalog service 965 through the catalog API 971 to the metadata database 969, and scheduler service 966 through the scheduler API 973 to the scheduler database 974. As described herein, boundary information capture process 700 may identify and store pre- and post-broadcast media content information and/or metadata on the boundary of the desired digital recording of the scheduled broadcast of linear and/or non-linear media content 853, 854 for an optimum user playback experience.

At 701, one or more service requests for recording desired media content may be received. In some embodiments, the desired media content for recording is the user service request. At 703, the content and predetermined time of the broadcast may be determined. For example, a resource manager may obtain information from a scheduler service to determine the media content and predetermined time of the broadcast of the media content. The resource manager may obtain information (such as the associated file information and/or metadata for the media content) from the scheduler service, a catalog service, or from other CDN sources.

At 705, a pre-recording time may be determined based on the predetermined time of the broadcast. At 707, a post-recording time may be determined based on the predetermined time of the broadcast.

At 709, the service request for the recording of the media content may be scheduled. In scheduling the service request, the pre-recording period and post-recording period may be accounted for. At 711, the segments of the media content may be stored in storage. At 715, file information and/or metadata information associated with the segments of the media content from 705, 707 and 709 may also be stored in the storage. At 717, the segments of the media content may be played back from storage. At 719, file information and/or metadata information associated with the segments of the media content from 705, 707 and 709 may be displayed.

If any file information and/or metadata associated with the segments of the media content is not found or missing, such file information and/or metadata may be identified (such as from a current manifest file, scheduler service database through a scheduler API, catalog service database through a catalog API, or other CDN or other resource). If the file information and/or metadata associated with the segments of the media content is not found, such file information and/or metadata may be identified by search of publicly available information sources based on the predetermined broadcast time of the media content as available.

In this manner, a user may create a recording of the media content for later display and playback. The user may also choose to view information of the recording of the media content as well as the media content in the pre-recording time and the media content in the post-recording time.

The system 800 may be configured with the resource manager 850 as an API designed as a component that resides on the gatekeeper 967. The resource manager 850 may be utilized for DVR recording and playback on the device 831. The resource manager 850 may be configured to determine pulling ABR segment configurations based on the bandwidth for the DVR 879 function according to the user device 831. For example, when the user tunes to a particular linear channel (or flipping through channels), the UX platform 858 may request a single linear stream from the resource manager 850. If the user navigates away from viewing linear TV, the resource manager 850 may release the stream from the device 831. Once the user starts viewing a channel, the UX platform 858 may be configured to report profile changes (such as registering 4K display device in the profile) to the resource manager 850 for further video control 860 of the available bandwidth and ABR resource management.

According to another embodiment, the system 800 may be configured with the UX platform 858 as an API that connects and subscribes to the resource manager 850 to receive resource notifications. The UX platform 858 may be configured with a mosaic viewing experience for the user having multiple streams displayed at once. In such a system, a main view and multiple other views may display multiple streams in a "mosaic" of tiles. The UX platform 858 may manage bandwidth of all the tiles on the Mosaic view, e.g., bandwidth for all mosaic tiles may utilize similar same bandwidth as a normal stream. When a user requests to view a video in full screen from a Mosaic view tile, the UX platform 858 may kill the Mosaic view stream and request a new stream for the full screen video. If a user goes back to the Mosaic view from playing a video (or an ongoing DVR recording is displayed in the Mosaic view), the video may still consume a stream until it gets stopped by the user. For any playback that requires an additional stream, the UX platform 858 may communicate with the resource manager 850 to request the stream.

In operation, the resource manager 850 may be configured to determine whether a stream may be allocated based the resources, policies, and applicable number of rules such as by a content management component of the DRM 983 and/or the token restriction check 982. The resource manager 850 may then broadcast the list of streams with their latest statuses to all connected devices 831, to the UX platform 858 of clients, and/or to the DVR 879 function. The UX platform 858 may present the information to the device 831 of a user as needed to resolve resource conflicts (such as, for example, the user choosing to end some conflicting streams to manually resolve a conflict). For any user actions that cause bandwidth resource changes, which may include a stream starts and a stream stops, the UX platform 858 may be required to report such events to the resource manager 850. The resource manager 850 may then update the resource statuses accordingly. The UX platform 858 may be configured to have the user's DVR 879 report to the resource manager 850 with current statuses of its streams.

The resource manager 850 may broadcast the list of streams (including active streams and terminated/stopped/blocked streams) to all connected UX platform 858 clients. The UX platform 858 may be required to process such notifications and take actions when necessary. The DVR 879 may connect and subscribe to the resource manager 850 to receive resource notifications. Near recording start time, whether it is X minutes (X is configurable by the DVR 879) or immediately before a recording starts (for impulse recordings), the DVR 879 may be required to communicate with the resource manager 850 to request a resource for a recording to start.

The resource manager 850 may determine whether a stream can be allocated based on a number of rules. The resource manager 850 may then broadcast the list of active streams and terminated streams to all connected UX platform 858 clients and the DVR 879. The UX platform 858 may present the information to the user as needed. In case of resource conflict, the user may choose to end some conflicting streams to manually resolve the conflict. If a recording cannot be started due to conflicting constraints, the DVR 879 may report the blocked (or failed) status back to the scheduler service 966. For any events that cause resource changes, which may include a recording starts/stops/fails, the DVR 879 may be required report such events to the resource manager 850. The resource manager 850 may then update the resource statuses accordingly. The resource manager 850 may broadcast the list of streams including active streams and terminated/stopped/blocked streams to all connected UX platform 858 clients and the DVR 879. The DVR 879 may be required to process such notifications and take actions when necessary.

In a particular embodiment, a system may include a CDN configured to ingest, process, and store a media content broadcast from a direct linear source to one or more ABR segments into a predetermined encoding format; a resource management system including: a manifest file associating metadata with the one or more ABR segments of the media content, storage configured to store the one or more ABR segments of the media content and metadata associated of the one or more ABR segments of the media content, and a DVR configured to record the media content as selected, the DVR responsive to a service request to store the media content as selected; a scheduler service system configured to provide schedule information of the broadcast of the media content; and a catalog service system configured to store and provide searchable metadata information for the one or more ABR segments of the media content stored in the CDN. The resource manager stores the metadata associated with the media content as selected including a second metadata for a second media content recorded in the pre-recording time and a third metadata for a third media content recorded in the pre-recording time such that each of the metadata, second metadata, and third metadata may be viewed on-demand.

In some examples of such an embodiment, each of the metadata, second metadata, and third metadata may be viewed on demand and may be stored in the one or more ABR segments of media content, second media content, and third media content, respectively, on a device of the user. In various examples, each of the metadata, second metadata, and third metadata is provided by one or more of the group of the manifest file, the scheduler service system, and/or the catalog service system. In some examples, each of the metadata, second metadata, and third metadata are provided by one or more of the group of the manifest file, the scheduler service system, the catalog service system, and/or publicly available information.

In another particular embodiment, a method for associating and storing metadata for a DVR from a direct linear source for a user includes receiving a service request for recording a scheduled broadcast a predetermined time of a program of media content; determining program metadata for the program of media for recording using a resource manager; identifying second metadata for a second media content for a pre-recording time to the predetermined time; identifying third metadata for a third media content for a post-recording time to the predetermined time, scheduling the recording of the desired the program of media content using the resource manager and a scheduling service system; and storing one or more ABR segments of the program of media content and metadata associated with the one or more ABR segments of the program of media, the second metadata for the second media content for a pre-recording time to the predetermined time, and the third metadata for the third media content for a post-recording time.

In some examples of such an implementation, the method further includes playing on demand the one or more ABR segments of the program of media content and metadata associated with the one or more ABR segments of the program of media. In various examples, the method further includes displaying the second metadata for the second media content for a pre-recording time to the predetermined time upon request and on demand. In some examples, the method further includes displaying the third metadata for the third media content for a post-recording time upon request and on demand.

In numerous examples, identifying each of the metadata, second metadata, and third metadata is accomplished by obtaining information available on the CDN from one or more of the group of the manifest file, the scheduler service system, and/or a catalog service system. In various examples, identifying each of the metadata, second metadata, and third metadata is accomplished by obtaining information available on the CDN from one or more of the group of the manifest file, the scheduler service system, a catalog service system and/or publicly available information.

Various particular embodiments relate to systems and methods for providing a recording and storing pre- and post-broadcast media content information and/or metadata on the boundary of the scheduled broadcast of the media content. Such systems and methods may allow for identifying, obtaining, and storing pre- and post-broadcast media content in an efficient and cost-effective manner to a subscriber in a CDN. Such systems and methods may obtain and store pre- and post-broadcast media content information and/or metadata from file information for the desired media content (e.g., VOD, DVR, nDVR) or other file based sources from the CDN.

As described above and illustrated in the accompanying figures, the present disclosure relates to capturing metadata for recorded content. An instance of content is recorded from a channel broadcast and/or other linear broadcast or content stream. A border that is a portion (such as less than five minutes) of an additional instance of content adjacent to the first content, such as content airing before or after the first content, is included. The border may accommodate schedule deviations to ensure the entire first content is recorded even if it starts earlier and/or ends later than scheduled. Metadata for this second content (and/or metadata for the first content and/or other content), which may be included with the broadcast, may also be recorded and/or stored. As such, the metadata regarding the content of the border may be presented upon user request in case the user becomes curious about the partially recorded additional content while accessing the intentionally recorded first content.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM);

erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A digital video recorder device, comprising:
 a non-transitory storage medium; and
 a processing unit that executes instructions stored in the non-transitory storage medium to:
 record a linear instance of content that is broadcast as part of a content stream to create a recording, the content stream including an additional linear instance of content immediately preceding or immediately following the linear instance of content in the content stream;
 include a border in the recording that comprises a portion of the content stream including part but not all of the additional linear instance of content;
 store metadata related to the additional linear instance of content, the metadata stored in association with the recording; and
 provide the metadata related to the additional linear instance of content upon request during access of the recording.

2. The digital video recorder device of claim 1, wherein the processing unit provides the metadata while presenting the border from the recording.

3. The digital video recorder device of claim 2, wherein the processing unit provides the metadata to identify the additional linear instance of content.

4. The digital video recorder device of claim 1, wherein the additional linear instance of content is previous to the linear instance of content in the content stream.

5. The digital video recorder device of claim 1, wherein the border accommodates a broadcast schedule deviation for the linear instance of content.

6. The digital video recorder device of claim 1, wherein the metadata includes a description of the additional linear instance of content.

7. The digital video recorder device of claim 1, wherein the border comprises less than five minutes of the content stream.

8. A digital video recorder system, comprising:
 a non-transitory storage medium; and
 a processing unit that executes instructions stored in the non-transitory storage medium to:
 in response to a user request, record first linear content from a channel broadcast to create a recording, the channel broadcast including second linear content immediately preceding or immediately following the first linear content in the channel broadcast; and
 store a border around the first linear content that comprises only a portion of the second linear content and metadata related to the second linear content.

9. The system of claim 8, wherein the processing unit:
 receives a request for the metadata during presentation of the recording; and
 provides the metadata.

10. The system of claim 8, wherein the processing unit provides the metadata as part of presenting programming guide information.

11. The system of claim 8, wherein the second linear content is subsequent to the first linear content in the channel broadcast.

12. The system of claim 8, wherein the processing unit discards additional metadata from the channel broadcast.

13. The system of claim 8, wherein the non-transitory storage medium and the processing unit are components of a user content access device that is operable to receive the channel broadcast from a content provider device.

14. The system of claim 8, wherein the processing unit records the first linear content from the channel broadcast by recording the channel broadcast during a time period associated with the first linear content.

15. A method for operating a digital video recorder, comprising:
 storing linear content received as part of a linear broadcast as a recording in a non-transitory storage medium;
 adding a border to the recording that includes a portion of additional linear content without including all of the additional linear content wherein the additional linear content is immediately preceding or immediately following the linear content in the linear broadcast;
 obtaining metadata for the additional linear content; and
 including the metadata in the recording.

16. The method of claim 15, wherein obtaining the metadata for the additional linear content comprises obtaining the metadata for the additional linear content from a source other than the linear broadcast.

17. The method of claim 16, wherein the source comprises an internet.

18. The method of claim 15, wherein obtaining the metadata for the additional linear content comprises obtaining the metadata for the additional linear content after adding the border to the recording.

19. The method of claim 15, wherein adding the border to the recording is performed at a same time as storing the linear content.

20. The method of claim 15, further comprising presenting the linear content from the recording on demand.

* * * * *